Patented Feb. 20, 1923.

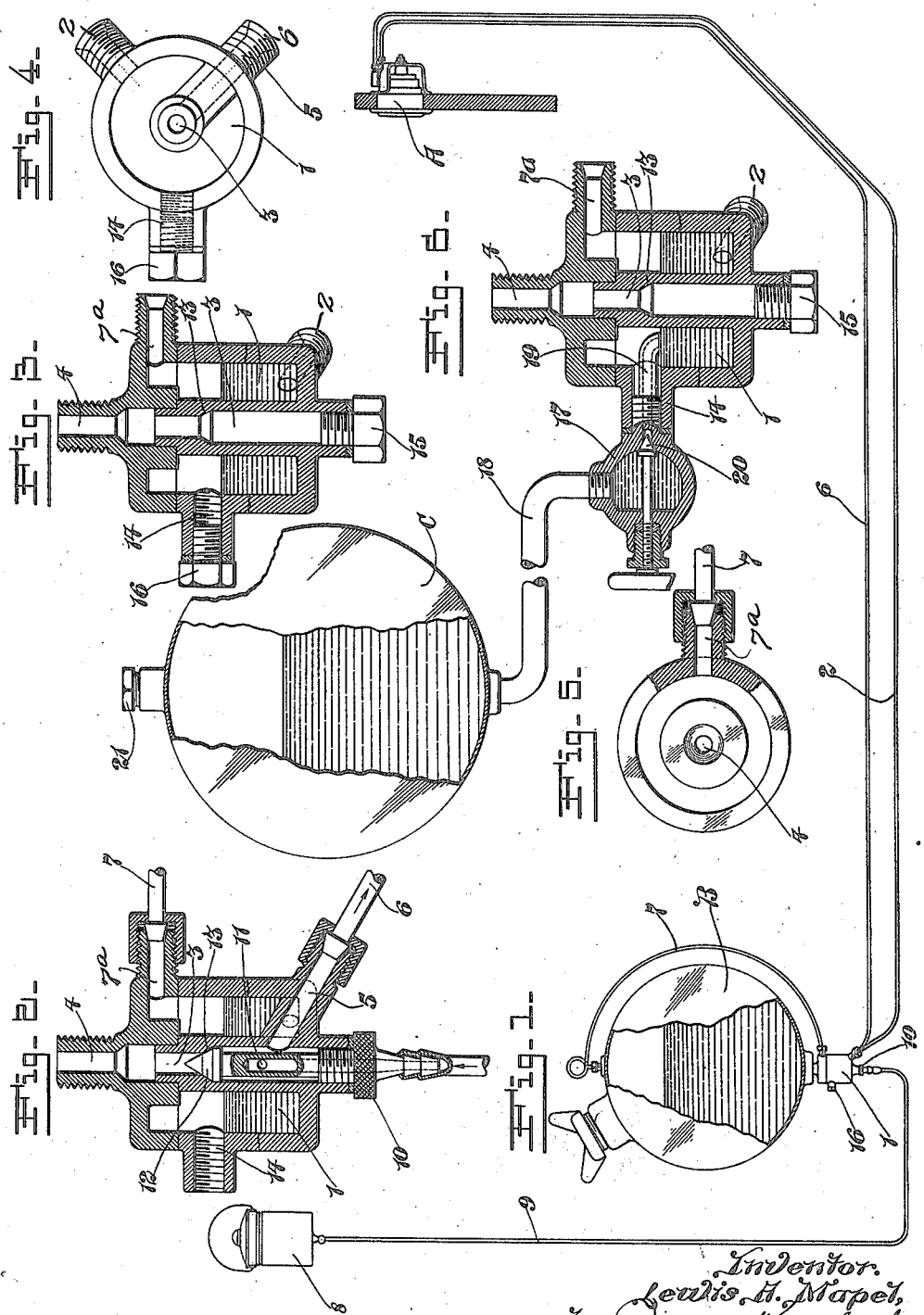

1,445,842

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

EQUIPMENT FOR INDICATING INSTRUMENTS.

Application filed October 25, 1920. Serial No. 419,551.

*To all whom it may concern:*

Be it known that I, LEWIS A. MAPEL, a citizen of the United States, residing at the city of St. Louis and State of Missouri, have invented a new and useful Equipment for Indicating Instruments, of which the following is a specification.

This invention relates to equipment for indicating instruments of the type which are used for giving indication of the height, depth or quantity of fluids or the contents of fluid containers.

My invention comprises equipment for use in connection with or as a part of indicating instruments to maintain the instruments in a condition in which they will efficiently function to obtain the desired results.

The subject-matter of the present invention comprises means for maintaining proper communication between the fluid the height, depth or quantity of which is to be indicated and a continuous column of fluid communicating with the indicating device of the indicating instrument, and means for replacing loss or decrease of the fluid in a second continuous column of fluid from the indicating device to the instrument, and means for maintaining an equalized condition above the level of the fluid the height, depth or quantity of which is to be indicated, and above the level of the fluid in the equipment which is comprised within the present invention.

An object of the invention is to provide means for obtaining the results mentioned in an efficient and satisfactory manner.

Another object of the invention is to provide equipment for an indicating instrument of the character mentioned which may be conveniently installed and placed in a condition for use, and which will remain in such condition without the necessity of removal or replacement of any of the parts thereof, so long as the parts remain unbroken or otherwise in proper condition.

Another object of the invention is to provide means for maintaining the source of one of the columns of fluid of the indicating instrument in indirect communication with the conditions above the level of the body of fluid the height, depth or quantity of which is to be indicated, by means of which loss or decrease of the fluid in the column of fluid is replaced, and by means of which both columns of fluid are maintained subject to the same conditions which exist above the level of the body of fluid.

Another object of the invention is to provide means for replacing any loss of fluid that may occur in the column of fluid which is in communication with the conditions above the level of the body of fluid the height, depth or quantity of which is to be indicated, and for maintaining an equalized condition above the level of the fluid the height, depth or quantity of which is to be indicated, and above the level of the fluid at the source of said column.

Another object of the invention is to provide novel and efficient means for automatically compensating or replacing any loss of fluid that may occur at the source of one of the columns.

Other objects will become apparent from the following description, without specific mention thereof at this point, reference being had to the drawings in which—

Fig. 1 is a view illustrating the general arrangement of an indicating instrument when applied to an automobile to indicate the approximately exact height, depth or quantity of liquid fuel in the supply tank, the indicating device being located on the instrument board and the present invention being embodied in the instrument.

Fig. 2 is a vertical sectional view of an important element of the present invention showing the connections for filling the instrument to complete installation thereof.

Fig. 3 is a similar sectional view detached from the filling connections.

Fig. 4 is a plan view of the lower part of the attachment shown in Figs. 2 and 3.

Fig. 5 is a lower end view of the upper part of the attachment shown in Figs. 2 and 3.

Fig. 6 is a sectional view illustrating the device for automatically compensating or replacing any loss of fluid that may occur at the source of one of the columns of fluid.

As shown in Fig. 1, which is a diagrammatic view of the indicating instrument applied to an automobile, the indicating device A of the instrument is supported in a position convenient for observation and, as shown, this may be on the instrument board of the automobile. In this use of an indicating instrument containing the present invention the instrument affords constant indication of the approximately exact height, depth or quantity of fluid, and variations in the height, depth or quantity thereof in the supply tank. It will be understood, however, that I do not restrict or limit myself to any particular or specific uses of the invention.

An important part of the present invention is that shown in Figs. 2 to 6 inclusive which has a chamber 1 therein and from which a small pipe 2 (Fig. 1) leads to the indicating device A. A passage 3 extends entirely across the vertical length of the chamber 1 for communication with the fluid tank B (Fig. 1). A projection 4 from the upper end of the wall of the chamber constitutes means for connection with the tank and has a passage therethrough for admitting fluid from the tank into the passage 3.

An outlet opening 5 from the passage 3 is in communication with a pipe or passage 6 leading to the indicating device A so that after the instrument has been applied and filled with fluid the indicating device will be affected by the weight of the fluid in the tank transmitted to the indicating device through the medium of the fluid in the pipe or passage 6.

The construction and arrangement of the indicating device A are not claimed herein, the same constituting the subject-matter of a separate invention. For present purposes it is sufficient to understand that the two columns of fluid, the one in the pipe 2 and the other in the pipe 6, are continuous and unbroken. The source of the fluid in the pipe 2 is the fluid in the chamber 1, and the weight of the body of fluid in the tank B acts constantly upon the column of fluid in the pipe 6 whereby the indicating instrument is affected.

As shown the member containing the chamber 1 and the passage 3—4 is in two parts. The upper part constitutes the upper wall of the chamber and is properly fitted in connection with the lower part so that the fluid cannot pass from the passage 3 into the chamber 1, or vice versa.

A passage 7 from the fluid supply tank B above the level of the fluid therein opens into the chamber 1 through an opening 7ª above the level of the fluid in said chamber. The relative volume of the chamber 1 to the combined volume of the passage 2 and its outlet is such that the height of the fluid in the chamber 1 is not materially changed by maximum expansion or contraction of the fluid in the pipe 2 and its outlet.

The method in which the present invention affects the functioning and operation of the instrument is more clearly comprehended by including a consideration of the manner in which the instrument is installed and placed in condition for use. The drawing affords basis for such consideration.

After the instrument has been mounted and connected up in the manner above described fluid is supplied to the indicating device A through the passages 3, 5 and 6 until the indicating device is completely filled with the fluid so as to exclude all air therefrom, as well from the passage 2, the exclusion of the air placing the indicating device entirely under the control of the fluid. Fluid may be supplied to fill the instrument in any desired way as, from a supply vessel 8, through the passage 9 communicating with an opening through the member 10 (Fig. 3) releasably secured within the passage 3 and having discharge outlets 11 through which the fluid is discharged into the passage 5, and thence into the indicating device A through the passage 6. The member 10 includes a valve portion 12 which, by contact with an appropriate valve seat 13 in the passage 3, closes communication with the vessel 8 while the instrument is being filled. The fluid flows into and completely fills the indicating device A and then flows through the pipe 2, excluding all air from the indicating device and from the pipe 2. From the pipe 2 the fluid enters the chamber 1 in which the fluid rises until it overflows through an overflow opening 14. The overflow of the fluid through the opening 14 affords an indication that the instrument is filled and that no more fluid is needed to place the instrument in condition for use.

After the instrument has been placed in condition for use the equipment for filling the instrument is detached by removing the member 10 and closing the lower end of the passage 3 by a closure 15 (Fig. 3). Also, the overflow opening 14 is closed by a closure 16.

It will be seen that in the construction and arrangement above described the fluid in the pipe 2 has its source in the fluid in the chamber 1 which is below the level of the body of fluid in the tank B, which fluid acts upon the fluid in the pipe 6 causing the indicating device A to furnish a constant indication of the approximately exact height, depth or quantity of the fluid in the tank B. Furthermore, the condition in the chamber 1 above the level of the fluid therein is maintained the same as the condition above the level of the fluid in the tank B, due to the fact that the passage 7 affords a means for maintaining the same condition at both places. This prevents changes such as barometric changes, changes in temperature, changes in pressure, or other changes from differently affecting the conditions in the chamber 1 and in the tank B, and also prevents loss or decrease of the fluid in the chamber 1. It is known that fluid confined in a closed tank causes saturation of the air in the tank above the fluid and, by use of the pipe 7, the saturated air in the tank is kept in communication with the space or air in the chamber 1 above the level of the fluid in said chamber, thereby preventing any loss or decrease of the fluid in said chamber. This is specially advantageous in uses of the instrument in which no replacement of the fluid in the chamber 1 is required, and in which it is only necessary to replace loss or decrease of the fluid initially placed therein when the instrument is installed and filled.

In the form of the invention shown in Fig. 6, automatic means is provided for replacing any loss or decrease of fluid that may occur in the chamber 1. However, it will be seen by reference to Fig. 6 that provision is made for connection of a pipe such as the pipe 7 (Fig. 1) there being a part 7ª for the attachment of the pipe 7 as in the construction first described. As shown in Fig. 6 the valve chamber 17 is provided in connection with the opening 14. The valve chamber 17 may be in communication with the fluid in a tank or reservoir C through a pipe 18 which will keep the valve chamber filled with fluid. A nozzle 19 extends from the valve chamber 17 into the chamber 1 and has its inner extremity turned downwardly and terminating at about the level of the fluid in the chamber 1. When the chamber 1 is filled with fluid to the proper depth, the fluid in said chamber seals the opening through the nozzle 19 and prevents the chamber 1 from becoming filled above the desired level according to the principle that is well understood.

As shown, the walls of the valve chamber 17 support a valve 20 which is manipulative to open and to close the passage through the nozzle 19. As shown the tank or reservoir C is closed and sealed against the pressure of atmosphere. The pressure above the fluid in the tank C is less than the pressure above the fluid in the chamber 1 and equal to the weight of the fluid from the source of the fluid in the tank or reservoir C to the mouth of the nozzle 19. Loss or decrease of fluid in the chamber 1 causes opening of the nozzle 19, thereby admitting air from the chamber 1 through the nozzle 19 to the space above the fluid in the tank or reservoir C, thus displacing a sufficient quantity of fluid to flow from the tank C through the nozzle 19 to automatically replenish loss or decrease of fluid in the chamber 1.

The form of the invention shown in Fig. 6 may be used satisfactorily in connection with any reservoir or other body of fluid which is wholly open to atmosphere. In such use of the invention there might occur some loss or decrease of fluid in the chamber 1, due to the fact that in such use of the invention the air in the chamber 1 above the level of the fluid therein would not be maintained sufficiently saturated to prevent any loss or decrease of fluid in said chamber. Any loss or decrease of fluid in the chamber that would result in such use of the invention would be automatically compensated or replaced by the construction and arrangement shown in Fig. 6, comprising the connections to the reservoir C which operate in the manner above described to conduct the necessary amount of fluid from said reservoir C into the chamber 1. Thus the invention is maintained in an efficiently operative condition whether used in connection with a closed tank such as B (Fig. 1) or in connection with an open reservoir or body of fluid as described in connection with Fig. 6.

When the fluid in the reservoir C becomes exhausted the same may be replenished by closing the valve 20 and removing the cap 21. Fluid is then delivered into the reservoir C after which the cap 21 is replaced and the valve 20 opened, and the device placed in use.

From the foregoing description it will be seen that the invention serves all of its intended purposes and that it is capable of a wide range of uses. The utility of the invention is not restricted to a connection with a closed tank, nor to a connection with an open reservoir or body of fluid. The invention may be used with equal efficiency in any case.

I do not restrict myself to unessential features or limitations, but I contemplate such variations in the construction and arrangement of the parts as may be found desirable or useful in the different uses to which the invention may be applied, and as may be within the scope of the appended claims.

What I claim and desire to secure by Letters Patent, is:—

1. In a fitting for an indicating instrument, a chamber arranged to contain a quantity of fluid and provided with an opening below the level of the fluid for connection with a pipe, a passage out of communication with the fluid in said chamber and provided with a fill opening with an additional opening for connection with a pipe, means for supporting the fitting in position to admit fluid from a body of fluid into said passage through the fitting, and means for replacing loss or decrease of the fluid in said chamber.

2. A fitting for an indicating instrument, comprising a chamber arranged to contain fluid at a predetermined level and having a passage therethrough out of communication with the chamber and in communication with a body of fluid, and means for replacing loss or decrease of the fluid in said chamber, whereby a substantially invariable quantity of fluid will be maintained in the chamber at all times.

3. A fitting for an indicating instrument, comprising a chamber arranged to contain fluid at a predetermined level and having a passage therethrough out of communication with the chamber and in communication with a body of fluid, and means for automatically replacing any loss or decrease of fluid that might occur in said chamber whereby a substantially invariable quantity of fluid will be maintained in the chamber at all times.

4. A fitting for an indicating instrument, comprising a chamber arranged to contain a quantity of fluid and having an overflow opening determining the level of fluid that will be retained in said chamber when the fluid is initially placed in said chamber, and also having a passage therethrough out of direct communication with the chamber and arranged to communicate with a body of fluid outside of the chamber, a pipe in communication with the passage through the chamber, means for delivering fluid into said passage and into said pipe, and a pipe for conducting the fluid into said chamber to the level permitted by said overflow opening.

5. A fitting for an indicating instrument, comprising a chamber arranged to contain a quantity of fluid and having an overflow opening determining the level of fluid that will be retained in said chamber when fluid is initially placed in said chamber, and also having a passage out of direct communication with the chamber and arranged to communicate with a body of fluid outside of the chamber, a pipe in communication with the passage through the chamber, means for delivering fluid into said passage and into said pipe, a pipe for conducting the fluid into said chamber to the level permitted by said overflow opening, and means for replacing loss or decrease of the fluid which is placed in said chamber.

6. The combination with a fluid supply tank, of a fitting for an indicating instrument, comprising a chamber arranged to contain a quantity of fluid at a constant level, and having a passage out of communication with the fluid in the chamber and arranged to communicate with the fluid in the tank, a pipe in communication with said passage, means for delivering fluid into said passage and into said pipe, a pipe for delivering fluid into said chamber, and a pipe extending from said chamber above the level of the fluid therein to a point above the level of the fluid in the tank maintaining an equalized condition above the level of the fluid in the chamber and above the level of the fluid in the tank and replacing loss or decrease of the fluid in the chamber.

7. The combination with a fluid supply tank, of a fitting for an indicating instrument, comprising a chamber arranged to contain a quantity of fluid at a constant level, and having a passage out of communication with the fluid in the chamber and arranged to communicate with the fluid in the tank, a pipe in communication with said passage, means for delivering fluid into said passage and into said pipe, a pipe for delivering fluid into said chamber, and means for automatically replacing any loss or decrease of fluid that might occur in said chamber.

8. A fitting for an indicating instrument, comprising a chamber arranged to contain fluid and having a passage out of communication with said chamber and arranged to communicate with a body of fluid, and also having an overflow opening for determining the level of the fluid that will be retained in the chamber when fluid is initially placed in said chamber, means for supporting the fitting in communication with a fluid receptacle, means for delivering fluid into said passage and into said chamber, and means for sealing said passage and said opening against all conditions excepting those existing in the instrument and in the fluid receptacle.

LEWIS A. MAPEL.